Patented Jan. 28, 1941

2,229,818

UNITED STATES PATENT OFFICE 2,229,818

COMPOUNDS OF THE CYCLOPENTANO-POLYHYDROPHENANTHRENE SERIES AND PROCESS OF MAKING SAME

Tadeus Reichstein, Zurich, and Albert Wettstein, Basel, Switzerland, assignors, by mesne assignments, to Ciba Pharmaceutical Products, Incorporated, Summit, N. J., a corporation of New Jersey No Drawing. Application March 22, 1938, Serial No. 197,510. In Switzerland March 29, 1937

18 Claims. (Cl. 260—397)

This invention relates to the manufacture of ketones or secondary alcohols of the cyclopentano-polyhydrophenanthrene series by treating with a reducing agent which is capable of exchanging the halogen atoms or diazo-groups of the side chains for hydrogen, a compound of the formula

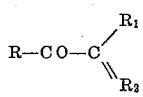

in which R is a radical containing the cyclopentano-polyhydrophenanthrene nucleus, $R_1$ is a member of the group consisting of hydrogen and a monovalent radical containing carbon, and $R_2$ is a member of the group consisting of two halogen atoms, a halogen and a hydrogen atom, a halogen atom and a monovalent radical containing carbon, and the diazo group.

Parent materials for the invention are, therefore, any compounds of the cyclopentano-polyhydrophenanthrene series which have in side chains α-mono- or -dihalogen-ketone or diazoketone groupings whose keto-groups lie on the side of the cyclic framework:

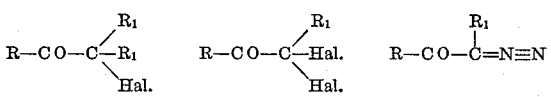

I.   II.   III.

In these formulae R and $R_1$ have the significance defined above; the side chains carrying keto-groups may in general be linked directly to the cyclic framework, for instance in positions 17 or 3, or they may be separated from the framework, for instance by one or more carbon atoms. Such diazo-ketones are obtainable, for example, by reaction of the corresponding acid halides with aliphatic diazo-compounds. From the diazoketones there are obtained by action of hydrogen halide or halogen the α-mono- or -dihalogenketones, whereby simultaneously or subsequently nuclear double bonds may also become saturated and finally any nuclear hydroxyl groups present oxidized to keto-groups. Since the compounds of the latter type are generally easily decomposed, it is frequently advantageous not to isolate them but to reduce them in crude condition in the presence or absence of a solvent or diluent.

Among compounds of the cyclopentano-polyhydrophenanthrene series are, for example, those of the type of aetiocholane, pregnane, oestrone, hydro-oestrone or their stereo-isomerides. These parent materials may be saturated or contain one or more unsaturated linkings. In addition to the aforesaid side chain groupings, they may contain further substituents, for example substituted or non-substituted hydroxyl-, carbinol-, amino-, carboxyl- or hydrocarbon groups or halogen atoms of which especially one may be attached to each of two adjacent carbon atoms respectively, as well as ring keto-groups or their enol derivatives, such as enol esters or enol ethers. In the last named case the enol groupings may be converted into keto-groups again after the reduction. As parent materials may be named especially saturated or unsaturated 3-hydroxy- or -3-keto-21-halogen-pregnane-ones-(20), for example 21-halogen-progesterones, 3-hydroxy- or 3-keto-21-halogen-pregnane-20-one-21 - carboxylic acid esters, further 3-hydroxy- or 3-keto-21-dihalogen-pregnane-ones-(20), 3 -dihalogenacetyl-aetio-allo-cholanols-(17) or -allo-cholaneones-(17), 3-hydroxy- or 3-keto-21 - diazo-pregnane-ones-(20) for example 21-diazo-progesterone, 3-hydroxy- or 3-keto-21-diazo-21-acetyl-pregnanones-(20) or their stereoisomerides and derivatives, especially enol derivatives and dihalogen substitution products, for instance 5:6-dibromo- or 5:6-dichloro-compounds.

For the purpose of exchanging the halogen atoms or diazo-groups in the side chains for hydrogen there is a large number of useful reducing agents available, for instance metals, such as zinc, copper, magnesium or their alloys, in the presence of various solvents, for instance alcohols, aqueous alcohols, acetic acid, mixtures of acetic acid and hydrogen halides, alkalis. Such reductions may also be electrolytic or by hydrogen catalytically excited for instance with nickel, palladium or platinum. Finally it is also possible to reduce the compounds with amalgams like aluminium amalgam or sodium amalgam, with zinc palladium, alkali iodide and glacial acetic acid, sodium and alcohol, a di-substituted aniline, or with a combination of these reducing agents. When reducing diazo-ketones there are frequently obtained hydrazones as by-products. The reduction is especially easy in the case of products iodinated in 21-position which give up their iodine even on long standing or when heated, for example with an organic solvent. Therefore, hydrogen iodide or salts thereof act on the other 21-halogen ketones in the sense of reducing agents. By the action of hydriodic acid for instance or iodides in presence of acids on the diazo-ketones one can exchange the diazo-group for hydrogen even directly.

Simultaneously with the halogen and the diazo-groups of the side chains other atomic groupings may be reduced, for example nuclear halogen to hydrogen atoms, keto-groups to secondary alcohol groups, $\alpha:\beta$-unsaturated ketones to saturated ketones or alcohols, as well as especially adjacent nuclear dihalogen substitution products (with restoration of the original double bonds) to nuclear unsaturated compounds. The nuclear double linkings so produced may be isomerised during or after the reduction by treatment with acids or alkalis. If the keto-group in the side chain is reduced to a secondary alcohol group, then subsequently a free or esterified hydroxyl group in $\alpha$-position to the latter may be eliminated by the action of an agent which splits off water or acid and thus the glycol obtained may be converted through an enol compound in itself unstable into the ketone:

$$\begin{array}{c} OR_4\ OH\ \ \ R_1 \\ |\ \ \ |\ \ \ / \\ -C-CH-C-R_1 \\ |\ \ \ \ \ \ \ \ \ \backslash H \end{array} \rightarrow \left[ \begin{array}{c} OH\ \ R_1 \\ |\ \ / \\ -C=C-C-R_1 \\ \ \ \ \ \ \ \backslash H \end{array} \right] \rightarrow -CH-CO-C\begin{array}{c} R_1 \\ / \\ \backslash H \end{array}$$

($R_4$=hydrogen or an acid radical).

For this purpose there may be used, for example, mineral acids, phosphorus hydroxy-chloride, bisulfates, formic acid, oxalic acid, acid anhydrides or catalysts such as iodine on the one hand or a basic agent, for instance an alkali metal or an alkaline earth metal or their hydroxides and carbonates, tertiary amines or carbonates, on the other hand. Instead of these agents or in combination with them other expedients may be used, for instance a raised temperature, especially in an indifferent gas or under reduced pressure.

If the reduction products still contain substituted or non-substituted carboxyl groups or even cyanogen groups, these may be subsequently saponified and/or decarboxylated.

The products of the invention may be separated and purified by recrystallisation, sublimation in a vacuum, selective adsorption or through their derivatives, for instance esters, condensation products with ketone reagents or by combination of such methods. They are very valuable compounds for therapeutical purposes or may be used as intermediate products for the preparation of such compounds.

The following examples illustrate the invention, the parts being by weight:

Example 1

1 part of $\Delta^5$-21-chloro-pregnene-3-ol-20-one-acetate of melting point 157–158° C. is dissolved in 6 parts of glacial acetic acid and the solution is mixed with 1 part of water and 1 part of zinc dust and shaken; the temperature of the mixture rises. After 10 minutes the whole is heated to 100° C. while still shaking for about 20 minutes, then concentrated in a vacuum, mixed with ether and filtered; the ethereal solution is washed with water and sodium carbonate, dried and evaporated. The residue is purified in the usual manner and there is thus obtained the known $\Delta^5$-pregnene-3-ol-20-one-acetate (Butenandt, Westphal, Cobler, Ber. Deutsch. Chem. Ges. vol. 67, page 1611, especially 1616, 1934). It is simpler to saponify the crude product directly to the free pregnene-ol-one of the formula which can be better purified and, for example, very easily crystallized from ether or toluene. Melting point 193° C.

The acetate may also be obtained by heating for 2 hours the acetylated chloro-ketone with 4 parts of alkali iodide in glacial acetic acid on the water bath. Subsequently the mass is decolorized with the necessary quantity of bisulfite solution and the operation is conducted as above.

Example 2

1 part of $\Delta^5$-21-chloro-pregnene-3-ol-20-one is dissolved in 6 parts of dioxane and the solution is mixed with 1 part of zinc dust, some water and 2 drops of concentrated hydrochloric acid; the mixture becomes warm. After the reaction has somewhat abated there is added some more water and the whole is heated for half an hour at about 90° C. The greater part of the dioxane is now evaporated in a vacuum and the residue is taken up in ether, filtered, washed well with ether, the ethereal solution extracted with water and sodium carbonate solution and evaporated. The remaining crystals of $\Delta^5$-pregnene-3-ol-20-one is purified as described in Example 1.

Example 3

1 part of $\Delta^5$-21-dibromo-pregnenol-(3)-one-(20) is mixed with a solution of 5 per cent. strength of hydrogen bromide in glacial acetic acid and 2 parts of a zinc-copper alloy, and the mixture is heated while shaking at 90° C. for half an hour. After filtration the filtrate is poured into water and extracted with ether. The ethereal solution is washed with bicarbonate solution and water, then dried and evaporated. The residue when recrystallized from dilute acetone is the $\Delta^5$-pregnenol-(3)-one-(20) of melting point 193° C. obtainable also as described in Examples 1 and 2.

Instead of free dibromo-pregnenolone there may be used for example its ester or ether derivatives, for example the acetate or the trityl ether. There is then obtained a corresponding pregnenolone ester or ether or, if saponification also is adopted, free pregneneolone.

If the reduction is by means of catalytically excited hydrogen in a neutral medium instead of zinc and hydrogen bromide in acetic acid, for instance hydrogen together with nickel or platinum in alcohol, there may be obtained a mixture of two $\Delta^5$-pregnene-diols-(3:20) isomeric at carbon atom 20, which by subsequent oxidation with temporary protection of the double linking, both yield the same progesterone. If one starts from compounds hydroxylated at the carbon atom 17 there are obtained 17,20-glycols of this kind, in the above special case $\Delta^5$-3,17,20-pregnene-triols. From the latter there may be obtained by heating with potassium bisulfate or phosphorus pentoxide in toluene or with sulfuric acid $\Delta^5$-pregnenol-(3)-one-(20) by elimination of water.

Example 4

1 part of 21-chloro-pregnane-3,20-dione is dissolved in 10 parts of glacial acetic acid, and there are added some water and 1 part of zinc dust; on shaking heat is freely developed. After 15 minutes the whole is heated for about half an hour on the water bath and then the glacial acetic acid is in large part distilled in a vacuum. The residue is taken up with ether and filtered, the ethereal solution being washed with water and sodium carbonate and dried and evaporated. This residue is purified in the usual manner by sublimation in a vacuum and/or by crystallization. The product thus obtained is the known pregnane-3,20-dione of the formula

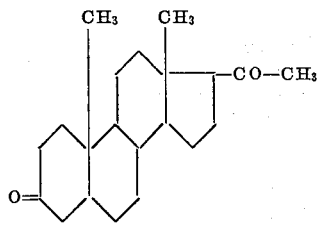

which melts at about 122° C.

Example 5

1 part of the 3-enol-acetate of 21-chloro-progesterone (obtained for example by reaction of $\Delta^{3,4}$-$\Delta^{5,6}$-3-acetoxy-aetio-cholane-dienic acid chloride with diazo-methane and subsequent action of hydrogen chloride) is mixed with 2 parts of zinc and 15 parts of glacial acetic acid, and the mixture is heated for 20 minutes while stirring briskly in the boiling water bath. The whole is filtered, the filtrate is precipitated with water, extracted with ether and the ethereal solution is washed with bicarbonate solution and water and evaporated. From this residue is obtained by recrystallization from dilute methanol or acetone the 3-enol-acetate of progesterone which melts at 135–136.5° C. and has the probable formula

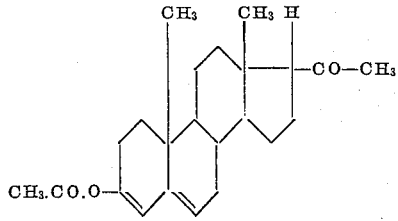

This body may be saponified by means of alcoholic potash lye of 2 per cent strength to the free progesterone [$\Delta^{4,5}$-pregnene-dione-(3,20)], which crystallizes in dimorphous forms melting at 120 and 129° C. respectively.

If, instead of the 21-chloro-, the 21-bromo- or 21-iodo-compound is used, the same reduction product is obtained in completely analogous manner.

If the parent material is a 3-enol ester of a 21-halogen-progesterone-21-carboxylic acid ester, there is obtained by the above process the enol ester of a progesterone-21-carboxylic acid ester which, by subsequent saponification and decarboxylation, is converted into progesterone.

Example 6

1 part of $\Delta^5$-21-diazo-pregnene-3-ol-20-one-acetate is mixed with 10 parts of alcohol, 4 parts of sodium iodide and 1 part of concentrated hydrochloric acid, and after abatement of the first lively reaction the mixture is boiled under reflux for 2 hours, whereby, in addition to the reduction, saponification occurs. After decolorizing with the necessary quantity of bisulfite or thiosulfate solution the mixture is worked up as described in Example 1. In this case also there is obtained crystallized $\Delta^5$-pregene-3-ol-20-one.

Example 7

1 part of 3-epi-hydroxy-21-diazo-allo-pregnanone-(20) is reduced by hydrogen in presence of palladium in an alcoholic solution. After filtering the catalyst the filtrate is precipitated by means of water, extracted with ether and the ethereal solution washed with water, then dried and evaporated. The residue is recrystallized from dilute alcohol and there is obtained the epi-allo-pregnanol-(3)-one-(20) of the formula

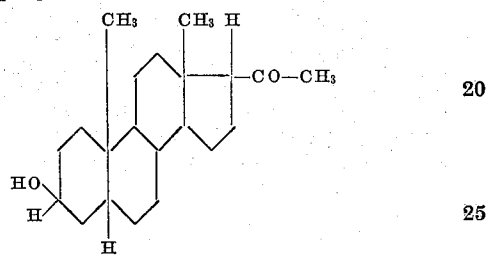

which melts at 172° C.

Instead of the free 3-hydroxy-diazo-compound there may be used an ester or an ether thereof, for instance the acetate or trityl ether.

Example 8

0.22 part of $\Delta^5$-21-chloro-pregnene-3-ol-20-one is dissolved in 2 parts of chloroform and the solution is mixed at 0° C. with 0.108 part of bromine dissolved in a little chloroform. After a few minutes the whole is evaporated to dryness in a vacuum at a low temperature, the residue is dissolved without heating in a small quantity of pure glacial acetic acid and the solution is mixed with one of 0.2 part of chromium trioxide in 5 parts of glacial acetic acid. After standing for 14 hours at room temperature, much water is added and the whole is shaken three times with pure ether; the ethereal solution is washed with some water and dried quickly. There is now added 0.5 part of zinc dust and, while shaking, the mass is concentrated at a bath temperature of 60° C. The residue which contains much acetic acid is thoroughly heated for 10 minutes on the boiling water bath and then diluted with much ethyl acetate; the whole is filtered, washed with water and sodium carbonate, dried and evaporated. For the purpose of completing the shifting of the double linking one may further heat to boiling with glacial acetic acid for 5 minutes and then operate as above described or by simple evaporation in the vacuum. The residue is sublimed in a high vacuum, the sublimate dissolved in ether and the solution inoculated. There are immediately obtained crystals of progesterone ($\Delta^4$-pregnene-3,20-dione) of the formula

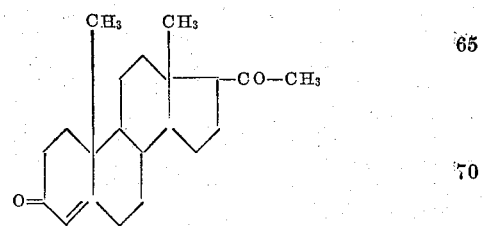

After one recrystallization this has the melting point 129° C. and may be converted in known manner into the lower melting modification.

The same substance is obtained if in the reduction there is used, instead of zinc dust, a two hours' heating on the water bath with 1 part of sodium iodide in glacial acetic acid solution. After diluting with water and decolorizing with thiosulfate solution the operation is conducted as described above.

Instead of 5,6,21-trihalogen-pregnane-3,20-dione the parent material may be 5,6,21,21-tetrahalogen-pregnane-dione-(3,20). This can be obtained for example by treating $\Delta^5$-21-diazo-pregnene-3-ol-20-one with 4 atoms of halogen, for example bromine, and oxidizing the 5,6,21,21-tetrahalogen-pregnane-3-ol-20-one thus obtained.

What we claim is:

1. A process for the manufacture of derivatives of the cyclopentanopolyhydrophenanthrene series, which comprises replacing by hydrogen a member of the group consisting of halogen and the diazo group in the side chain of a compound of the said series which is substituted in the 17-position by the side chain

in which $R_1$ is a member of the group consisting of hydrogen, a hydrocarbon radical, an alkyl-substituted carboxyl group and cyanogen group, and $R_2$ is a member of the group consisting of two halogen atoms, a halogen and a hydrogen atom, a halogen atom and a hydrocarbon radical, a halogen atom and an alkyl-substituted carboxyl group, a halogen atom and a cyanogen group, and the diazo group, by reacting the said compound with a reducing agent capable of replacing said member of the group consisting of the halogen and the diazo group in the side chain by hydrogen.

2. A process for the manufacture of derivatives of the cyclopentanopolyhydrophenanthrene series, which comprises replacing by hydrogen a member of the group consisting of halogen and the diazo group in the side chain of a compound of the said series which is substituted in the 17-position by the side chain

in which $R_1$ is a member of the group consisting of hydrogen, a hydrocarbon radical, an alkyl-substituted carboxyl group and cyanogen group, and $R_2$ is a member of the group consisting of two halogen atoms, a halogen and a hydrogen atom, a halogen atom and a hydrocarbon radical, a halogen atom and an alkyl-substituted carboxyl group in the side chain to a secondary carbinol and the diazo group and simultaneously reducing the keto group in the side chain to a secondary carbinol group, by reacting the said compound with a reducing agent capable of replacing said member of the group consisting of the halogen and the diazo-group in the side chain by hydrogen and of simultaneously reducing the keto group in the side chain to a secondary carbinol group, and then eliminating from the α-position to the said secondary carbinol group a member of the group consisting of free hydroxyl and esterified hydroxyl by reacting the reduced compound with a reagent capable of splitting off water and acid.

3. A process for the manufacture of derivatives of the cyclopentanopolyhydrophenanthrene series, which comprises replacing by hydrogen a member of the group consisting of halogen and the diazo group in the side chain of a compound of the said series which is substituted in the 17-position by the side chain

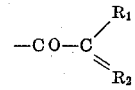

in which $R_1$ is a member of the group consisting of hydrogen, a hydrocarbon radical, an alkyl-substituted carboxyl group and cyanogen group, and $R_2$ is a member of the group consisting of two halogen atoms, a halogen and a hydrogen atom, a halogen atom and a hydrocarbon radical, a halogen atom and an alkyl-substituted carboxyl group, a halogen atom and a cyanogen group, and the diazo group, by reacting the said compound with a reducing agent capable of replacing said member of the group consisting of the halogen and the diazo group in the side chain by hydrogen and then saponifying and decarboxylating the resultant carboxylic acid derivative.

4. A process for the manufacture of derivatives of the cyclopentanopolyhydrophenanthrene series, which comprises replacing by hydrogen a member of the group consisting of halogen and the diazo group in the side chain of a compound of the said series which contains nuclear double carbon linkings saturated by halogen and is substituted in the 17-position by the side chain

—CO—C⟨$R_1$/$R_2$ in which $R_1$ is a member of the group consisting of hydrogen, a hydrocarbon radical, an alkyl-substituted carboxyl group and a cyanogen group, and $R_2$ is a member of the group consisting of two halogen atoms, a halogen and a hydrogen atom, a halogen atom and a hydrocarbon radical, a halogen atom and an alkyl-substituted carboxyl group, a halogen atom and a cyanogen group, and the diazo group and simultaneously regenerating the said nuclear double linkings, by reacting the said compound with a reducing agent capable of replacing said member of the group consisting of the halogen and the diazo group in the side chain by hydrogen and of simultaneously regenerating the said nuclear double linkings.

5. A process for the manufacture of derivatives of the cyclopentanopolyhydrophenanthrene series, which comprises replacing by hydrogen a member of the group consisting of halogen and the diazo group in the side chain of a compound of the said series which contains nuclear keto groups and nuclear double carbon linkings saturated by halogen and is substituted in the 17-position by the side chain

—CO—C⟨$R_1$/$R_2$ in which $R_1$ is a member of the group consisting of hydrogen, a hydrocarbon radical, an alkyl-substituted carboxyl group and a cyanogen group, and $R_2$ is a member of the group consisting of two halogen atoms, a halogen and a hydrogen atoms, a halogen atom and a hydrocarbon radical, a halogen atom and an alkyl-substituted carboxyl group, a halogen atom and a cyanogen group, and the diazo group and simultaneously regenerating the said nuclear double linkings, by reacting the said compound with a reducing agent capable of replacing said member of the group consisting of the halogen and the diazo group in the side chain by hydrogen and of simultaneously regenerating the said nuclear double linkings.

6. A process for the manufacture of derivatives of the cyclopentanopolyhydrophenanthrene series, which comprises replacing by hydrogen a member of the group consisting of halogen and the diazo group in the side chain of a compound of the said series which contains nuclear keto groups and nuclear double carbon linkings saturated by halogen and is substituted in the 17-position by the side chain

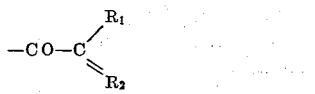

in which $R_1$ is a member of the group consisting of hydrogen, a hydrocarbon radical, an alkyl-substituted carboxyl group and a cyanogen group, and $R_2$ is a member of the group consisting of two halogen atoms, a halogen and a hydrogen atom, a halogen atom and a hydrocarbon radical, a halogen atom and an alkyl-substituted carboxyl group, a halogen atom and a cyanogen group, and the diazo group and simultaneously regenerating the said nuclear double linkings, by reacting the said compound with a reducing agent capable of replacing said member of the group consisting of the halogen and the diazo group in the side chain by hydrogen and of simultaneously regenerating the said nuclear double linkings and isomerizing the restored nuclear double linkings by reaction with a member of the group consisting of an acid and an alkali.

7. A process for the manufacture of derivatives of the cyclopentanopolyhydrophenanthrene series, which comprises replacing by hydrogen a member of the group consisting of halogen and the diazo group in the side chain of a compound of the said series which contains nuclear keto groups and nuclear double carbon linkings saturated by halogen and is substituted in the 17-position by the side chain

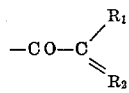

in which $R_1$ is a member of the group consisting of hydrogen, a hydrocarbon radical, an alkyl-substituted carboxyl group and a cyanogen group, and $R_2$ is a member of the group consisting of two halogen atoms, a halogen and a hydrogen atom, a halogen atom and a hydrocarbon radical, a halogen atom and an alkyl-substituted carboxyl group, a halogen atom and a cyanogen group, and the diazo group and simultaneously regenerating the said nuclear double linkings, by reacting the said compound in crude condition with a reducing agent capable of replacing said member of the group consisting of the halogen and the diazo group in the side chain by hydrogen and of simultaneously regenerating the said nuclear double linkings and isomerizing the restored nuclear double linkings by reaction with a member of the group consisting of an acid and an alkali.

8. A process for the manufacture of derivatives of the cyclopentanopolyhydrophenanthrene series, which comprises replacing by hydrogen a member of the group consisting of halogen and the diazo group in the side chain of a compound of the said series which contains nuclear keto groups and nuclear double carbon linkings saturated by halogen and is substituted in the 17-position by the side chain

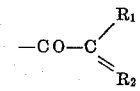

in which $R_1$ is a member of the group consisting of hydrogen, a hydrocarbon radical, an alkyl-substituted carboxyl group and a cyanogen group, and $R_2$ is a member of the group consisting of two halogen atoms, a halogen and a hydrogen atom, a halogen atom and a hydrocarbon radical, a halogen atom and an alkyl-substituted carboxyl group, a halogen atom and a cyanogen group, and the diazo group and simultaneously regenerating the said nuclear double linkings, by reacting the said compound in crude condition and in the presence of a diluting agent with a reducing agent capable of replacing said member of the group consisting of the halogen and the diazo group in the side chain by hydrogen and of simultaneously regenerating the said nuclear double linkings and isomerizing the restored nuclear double linkings by reaction with a member of the group consisting of an acid and an alkali.

9. The process defined in claim 8, wherein the parent compound is of the formula

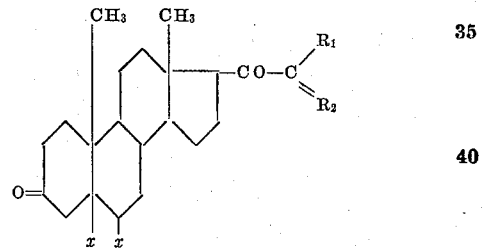

wherein $x$ represents halogen, and $R_1$ and $R_2$ have the significance recited in claim 8.

10. The compounds of the cyclopentanopolyhydrophenanthrene series substituted in the 17-position by the side chain

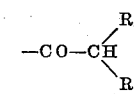

wherein $R_1$ is a member of the group consisting of a hydrocarbon radical, an alkyl-substituted carboxyl group and a cyanogen group, and $R_2$ is a member of the group consisting of hydrogen, a hydrocarbon radical, an alkyl-substituted carboxyl group and a cyanogen group.

11. The compounds of the cyclopentanopolyhydrophenanthrene series substituted in the 17-position by the side chain

in which $R_1$ is a member of the group consisting of alkyl, aralkyl and aryl.

12. The compounds of the 10,13-dimethyl cyclopentanopolyhydrophenanthrene series substituted in the 17-position by the side chain

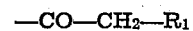

in which $R_1$ is a member of the group consisting of alkyl, aralkyl and aryl.

13. The compounds of the formula

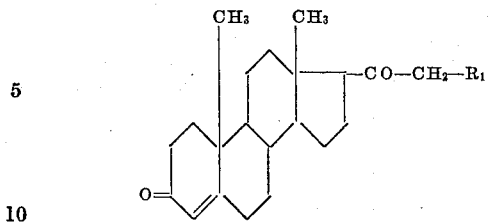

in which $R_1$ is a member of the group consisting of alkyl, aralkyl and aryl.

14. The compounds of the formula

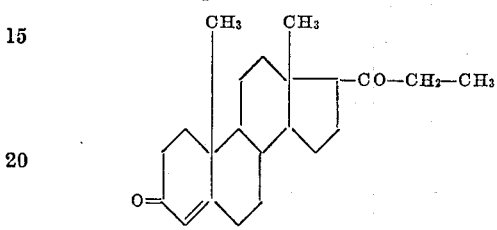

15. The compounds of the formula

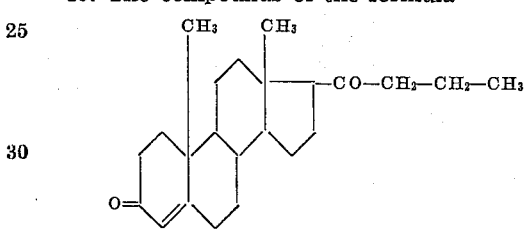

16. The compounds of the 10,13-dimethyl cyclopentanopolyhydrophenanthrene series substituted in the 17-position by the side chain $$-CO-CH_2-R_1$$

wherein $R_1$ represents an alkyl-substituted carboxyl group.

17. The compounds of the formula

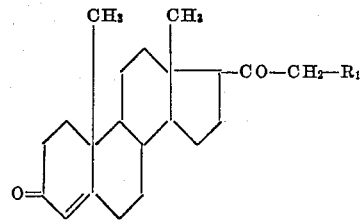

in which $R_1$ represents an alkyl-substituted carboxyl group.

18. The compounds of the formula

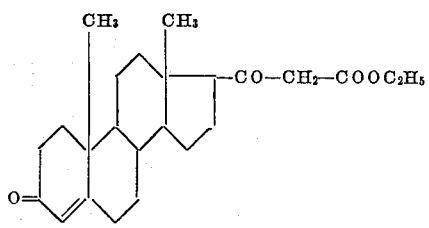

TADEUS REICHSTEIN.
ALBERT WETTSTEIN.